(12) United States Patent
Imanishi

(10) Patent No.: US 10,012,272 B2
(45) Date of Patent: Jul. 3, 2018

(54) CLUTCH DEVICE

(71) Applicant: EXEDY Corporation, Neyagawa-shi, Osaka (JP)

(72) Inventor: Yoshio Imanishi, Neyagawa (JP)

(73) Assignee: EXEDY CORPORATION, Neyagawa-shi, Osaka (JP)

( * ) Notice: Subject to any disclaimer, the term of this patent is extended or adjusted under 35 U.S.C. 154(b) by 70 days.

(21) Appl. No.: 15/353,140

(22) Filed: Nov. 16, 2016

(65) Prior Publication Data

US 2017/0198759 A1   Jul. 13, 2017

(30) Foreign Application Priority Data

Jan. 13, 2016   (JP) .................................. 2016-004417

(51) Int. Cl.
  *F16D 23/12*   (2006.01)
  *F16D 13/52*   (2006.01)
  *F16D 13/56*   (2006.01)

(52) U.S. Cl.
  CPC ............. *F16D 23/12* (2013.01); *F16D 13/52* (2013.01); *F16D 13/56* (2013.01); *F16D 2013/565* (2013.01); *F16D 2023/123* (2013.01); *F16D 2300/22* (2013.01)

(58) Field of Classification Search
  None
  See application file for complete search history.

(56) References Cited

U.S. PATENT DOCUMENTS

| | | | | |
|---|---|---|---|---|
| 3,429,412 A | * | 2/1969 | Wobrock | ................ F16D 23/12 188/196 BA |
| 4,787,493 A | * | 11/1988 | Ohsono | ................... F16D 23/12 192/111.14 |
| 5,588,517 A | * | 12/1996 | Kooy | ..................... B60K 17/02 192/111.12 |

FOREIGN PATENT DOCUMENTS

JP    2013096421 A    5/2013

* cited by examiner

*Primary Examiner* — Colby M Hansen
(74) *Attorney, Agent, or Firm* — United IP Counselors, LLC

(57) ABSTRACT

A clutch device includes a cam mechanism. The cam mechanism includes a first cam portion and a second cam portion, and is disposed between a lifter plate and a pressure plate. The first cam portion is discrete from the pressure plate, and is unitarily rotated with the lifter plate and the pressure plate. The second cam portion is unitarily rotated with the clutch center. The first cam portion has a first cam surface. The first cam surface faces a first side in a circumferential direction, and faces the pressure plate in the axial direction. The second cam portion has a second cam surface. The second cam surface faces a second side in the circumferential direction, and faces the lifter plate in the axial direction. The first cam surface and the second cam surface are opposed to each other.

8 Claims, 3 Drawing Sheets

CLUTCH DEVICE

CROSS-REFERENCE TO RELATED APPLICATIONS

This application claims priority to Japanese Patent Application No. 2016-004417 filed on Jan. 13, 2016, the entirety of which is hereby incorporated by reference in its entirety.

BACKGROUND

Technical Field

The present disclosure relates to a clutch device.

Background Information

In general, motorcycles (a two-wheeled motorcycle, a buggy, etc.) use a clutch device for allowing or blocking transmission of power from an engine to a transmission. The clutch device includes a clutch housing, a clutch center, a clutch portion and a pressure plate. The clutch housing is coupled to an engine crankshaft side. The clutch center is coupled to a transmission side. The clutch portion is disposed between the clutch housing and the clutch center, and is configured to allow or block transmission of power. The pressure plate is configured to press the clutch portion.

Japan Laid-open Patent Application Publication No. 2013-96421describes a clutch device including cam mechanisms for increasing a press-contact force applied by the clutch center and the pressure plate. Each cam mechanism is composed of slopes of each of openings and slopes of each of protrusions disposed within the openings.

In the aforementioned clutch device, each opening is required to have a larger circumferential dimension than each protrusion so as to dispose each protrusion therein. Hence, this causes a drawback that large gaps are inevitably produced between the slopes of each opening and those of each protrusion.

BRIEF SUMMARY

It is an object of the present disclosure to provide a clutch device in which a gap between a first cam surface and a second cam surface can be reduced in size.

A clutch device according to an aspect of the present disclosure includes a lifter plate, a pressure plate, a clutch center, a clutch portion and a cam mechanism. The pressure plate includes a pressure applying part. The pressure plate is disposed at an interval from the lifter plate in an axial direction. The clutch center includes a pressure receiving part that is disposed at an interval from the pressure applying part in the axial direction. The clutch center is disposed between the lifter plate and the pressure plate. The clutch portion is disposed between the pressure applying part and the pressure receiving part. The clutch portion is configured to allow or block transmission of a power therethrough. The cam mechanism includes a first cam portion and a second cam portion. The cam mechanism is disposed between the lifter plate and the pressure plate. The first cam portion is a discrete member from the pressure plate. The first cam portion is configured to be unitarily rotated with the lifter plate and the pressure plate. The second cam portion is configured to be unitarily rotated with the clutch center. The first cam portion is provided with a first cam surface. The first cam surface faces a first side in a circumferential direction, while facing the pressure plate in the axial direction. The second cam portion is provided with a second cam surface. The second cam surface faces a second side in the circumferential direction, while facing the lifter plate in the axial direction. The first cam surface and the second cam surface are opposed to each other.

According to the clutch device constructed as described above, the first cam portion is a discrete member from the lifter plate and the pressure plate. With this construction, assemblage of the first cam portion is enabled after assemblage of the clutch center and the pressure plate. Therefore, a gap between the first cam surface and the second cam surface can be reduced in size.

When viewed in the axial direction, the first cam surface and the second cam surface may be disposed to overlap with each other.

The first cam portion may be provided with a third cam surface. The third cam surface faces the second side in the circumferential direction, while facing the pressure plate in the axial direction. Additionally, the second cam portion may be provided with a fourth cam surface. The fourth cam surface faces the first side in the circumferential direction, while facing the lifter plate in the axial direction. The third cam surface and the fourth cam surface may be opposed to each other.

When viewed in the axial direction, the third cam surface and the fourth cam surface may be disposed to overlap with each other.

The first cam portion may be configured to be unitarily rotated with the lifter plate and the pressure plate while being interposed and held therebetween.

The first cam portion may be provided with a through hole extending in the axial direction. Additionally, the pressure plate may include a protrusion extending within the through hole.

The clutch device may further include a fastener member fixing the lifter plate and the pressure plate.

The first cam portion may be a discrete member from the lifter plate.

Overall, according to the present disclosure, a gap between the first cam surface and the second cam surface can be reduced in size.

BRIEF DESCRIPTION OF THE DRAWINGS

Referring now to the attached drawings which form a part of this original disclosure.

DETAILED DESCRIPTION OF EMBODIMENTS

Figure 1:
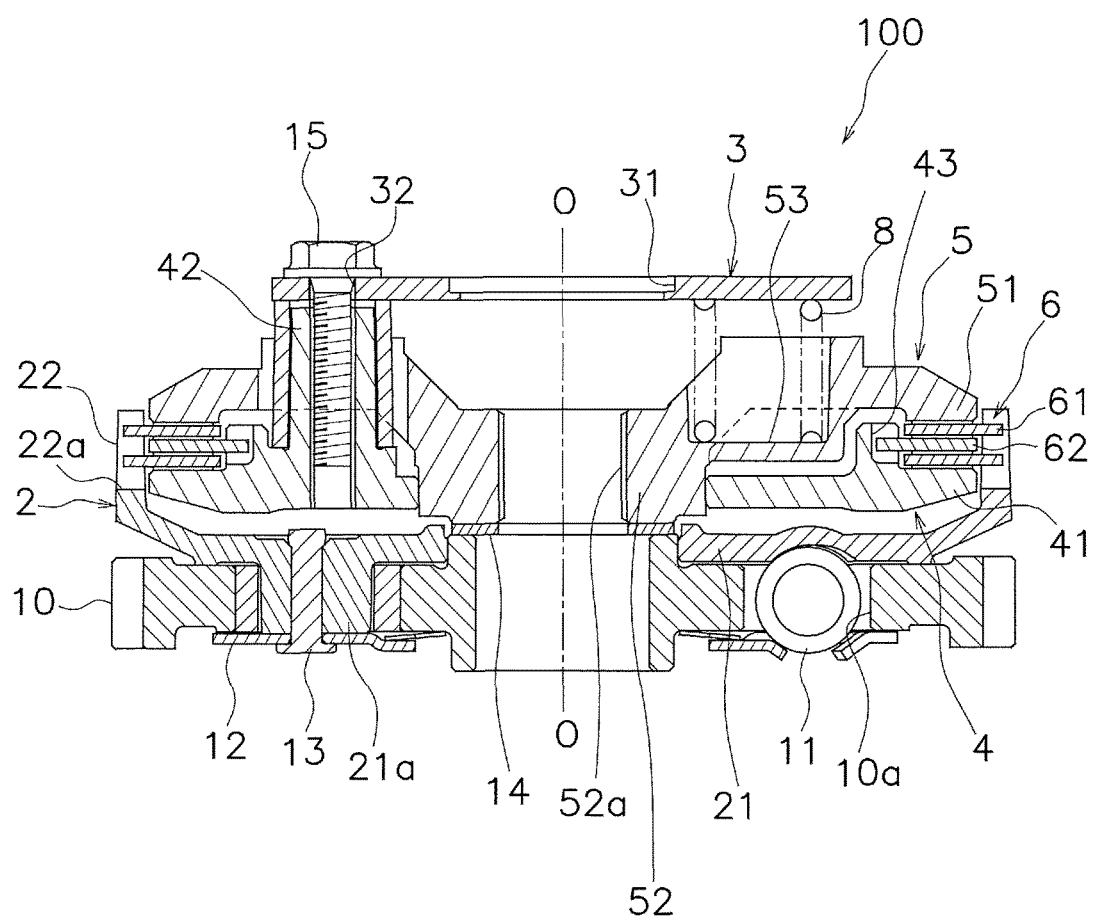
FIG. 1 is a cross-sectional view of a clutch device.
Figure 2:
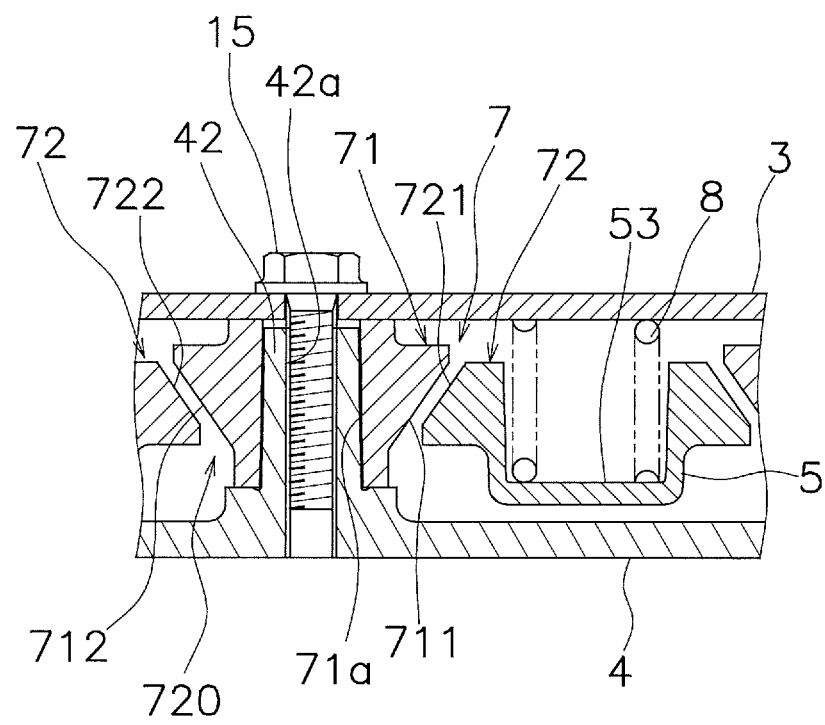
FIG. 2 is a cross-sectional view of the clutch device in which a cam mechanism is mainly focused.

A clutch device according to a preferred embodiment of the present disclosure will be explained with reference to drawings. It should be noted that the clutch device according to the present preferred embodiment is designed to be used in a motorcycle. FIG. 1 is a cross-sectional view of the clutch device, whereas FIG. 2 is a cross-sectional view of the clutch device in which a cam mechanism is mainly focused. It should be noted that the term "axial direction" refers to an extending direction of a rotational axis O of the clutch device, whereas the term "circumferential direction" refers to a circumferential direction of an imaginary circle about the rotational axis O. The term "radial direction" refers to a radial direction of the imaginary circle about the rotational axis O.

As shown in FIGS. 1 and 2, a clutch device 100 is configured to allow or block transmission of power from an engine to a transmission. The clutch device 100 includes a clutch housing 2, a lifter plate 3, a pressure plate 4, a clutch center 5, a clutch portion 6 and a plurality of cam mechanisms 7. Additionally, the clutch device 100 further includes a plurality of urging members 8.

The clutch housing 2 includes a disc part 21 and a tubular part 22, and is coupled to an input gear 10. The input gear 10 is an approximately annular member into which power generated by the engine (not shown in the drawings) is inputted. The input gear 10 is meshed with a drive gear (not shown in the drawings) fixed to an engine-side crankshaft.

The disc part 21 is provided with a plurality of protrusions 21a protruding axially toward the input gear 10. The protrusions 21a are disposed at intervals in the circumferential direction. The input gear 10 is coupled to the disc part 21 through a plurality of coil springs 11. The plural protrusions 21a of the disc part 21 and the plural coil springs 11 are inserted into holes 10a provided in the input gear 10. Additionally, the clutch housing 2 and the input gear 10 are coupled through a plate 12 and rivets 13. The coil springs 11 are provided for absorbing vibration from the engine.

The tubular part 22 extends axially toward the lifter plate 3 from the outer peripheral edge of the disc part 21. The tubular part 22 is provided with a plurality of cutouts 22a extending in the axial direction. The cutouts 22a are disposed at intervals in the circumferential direction.

The lifter plate 3 has an approximately disc shape and is provided with an opening 31 in its middle part. A release mechanism (not shown in the drawings) is coupled to the opening 31. The lifter plate 3 is coupled to the pressure plate 4. The lifter plate 3 is provided with a plurality of through holes 32. The through holes 32 are disposed at intervals in the circumferential direction. Additionally, the through holes 32 extend in the axial direction. Bolts 15 extend while penetrating the through holes 32.

The pressure plate 4 is disposed at an interval from the lifter plate 3 in the axial direction. Additionally, the pressure plate 4 is disposed radially inside the tubular part 22 of the clutch housing 2.

The pressure plate 4 includes a pressure applying part 41. The pressure plate 4 has a disc shape, and its outer peripheral part corresponds to the pressure applying part 41. The pressure applying part 41 has an annular shape. The pressure applying part 41 faces the lifter plate 3 in the axial direction.

The pressure plate 4 is attached to a boss 52 of the clutch center 5 to be described. Specifically, the pressure plate 4 is provided with an opening in its middle part. The boss 52 of the clutch center 5 is fitted to the opening of the pressure plate 4. The pressure plate 4 is movable in the axial direction. In other words, the pressure plate 4 is slidable on the boss 52 of the clutch center 5 in the axial direction.

The pressure plate 4 includes a plurality of protrusions 42. The protrusions 42 extend axially toward the lifter plate 3. The protrusions 42 are disposed at equal intervals in the circumferential direction. Each protrusion 42 is provided with a screw hole 42a that extends in the axial direction. Each protrusion 42 axially extends within a through hole 71a provided in each of first cam portions 71 to be described. Additionally, each bolt 15 is screwed into the screw hole 42a of each protrusion 42 of the pressure plate 4. With this construction, the lifter plate 3 and the pressure plate 4 are configured to be unitarily rotated while being fixed to each other. Additionally, the lifter plate 3 and the pressure plate 4 are configured to be unitarily moved in the axial direction. It should be noted that the lifter plate 3 and the pressure plate 4 are configured to be movable relatively to the clutch center 5 in the axial direction.

The clutch center 5 is disposed axially between the lifter plate 3 and the pressure plate 4. Additionally, the clutch center 5 is disposed radially inside the tubular part 22 of the clutch housing 2.

The clutch center 5 includes a pressure receiving part 51. The pressure receiving part 51 is provided as the outer peripheral part of the clutch center 5. The pressure receiving part 51 has an annular shape. The pressure receiving part 51 faces axially toward the pressure plate 4. The pressure receiving part 51 is disposed at an interval from the pressure applying part 41 in the axial direction. The pressure receiving part 51 is opposed to the clutch portion 6. The clutch portion 6 is disposed between the pressure applying part 41 and the pressure receiving part 51. In other words, the pressure applying part 41, the clutch portion 6 and the pressure receiving part 51 are aligned in this order in the axial direction. When the clutch portion 6 is removed, the pressure applying part 41 and the pressure receiving part 51 are disposed in opposition to each other.

The clutch center 5 has an approximately disc shape and is provided with the boss 52 in its middle part. The boss 52 extends to protrude oppositely to the lifter plate 3 in the axial direction. The boss 52 is provided with an axially extending spline hole 52a in its middle part. An input shaft of the transmission (not shown in the drawings) is engaged with the spline hole 52a. A thrust plate 14 is mounted between the boss 52 and the middle part of the input gear 10. The clutch center 5 is configured to be immovable in the axial direction.

The clutch center 5 is provided with a plurality of recesses 53. The recesses 53 are recessed oppositely to the lifter plate 3 in the axial direction. The recesses 53 are aligned at intervals in the circumferential direction. An end of each urging member 8 is accommodated in each recess 53.

The clutch portion 6 includes at least one first clutch plate 61 and at least one second clutch plate 62. The first and second clutch plates 61 and 62 are disposed between the pressure receiving part 51 and the pressure applying part 41. Transmission of power is allowed or blocked between the clutch housing 2 and the clutch center 5 through the first and second clutch plates 61 and 62. The both types of clutch plates 61 and 62 have annular shapes and are alternately disposed in the axial direction.

Each first clutch plate 61 is axially movable with respect to the clutch housing 2, while being non-rotatable relatively thereto. In other words, each first clutch plate 61 is configured to be unitarily rotated with the clutch housing 2. When described in detail, each first clutch plate 61 is provided with a plurality of engaging protrusions on its outer peripheral part. The engaging protrusions protrude radially outward therefrom. The engaging protrusions are meshed with the cutouts 22a provided in the tubular part 22 of the clutch housing 2. Friction members are attached to the both surfaces of each first clutch plate 61. The lifter plate 3-side one of the friction members attached to the first clutch plate 61 located closest to the lifter plate 3 in the axial direction is engageable by friction with the pressure receiving part 51 of the clutch center 5.

Each second clutch plate 62 is provided with a plurality of engaging protrusions on its inner peripheral end. The engaging protrusions protrude radially inward therefrom. The engaging protrusions are meshed with engaging grooves 43 provided on the pressure plate 4. Therefore, each second clutch plate 62 is axially movable with respect to the pressure plate 4, while being non-rotatable relatively thereto. In other words, each second clutch plate 62 is configured to be unitarily rotated with the pressure plate 4.

The pressure applying part 41 is configured to press the clutch portion 6 axially toward the lifter plate 3. The pressure applying part 41 is engageable by friction with the pressure applying part 41-side one of the friction members attached to the first clutch plate 61 (or the second clutch plate 62) disposed closest to the pressure applying part 41 in the axial direction. A clutch-on state (power transmission allowed state) is configured to be made when the clutch portion 6 is pressed by the pressure applying part 41 and the pressure receiving part 51 while being interposed therebetween.

The cam mechanisms 7 are disposed axially between the lifter plate 3 and the pressure plate 4. The cam mechanisms 7 are disposed at intervals in the circumferential direction. Each cam mechanism 7 includes the first cam portion 71 and a second cam portion 72. The first cam portions 71 are configured to be unitarily rotated with the lifter plate 3 and the pressure plate 4. The first cam portions 71 are discrete members from the lifter plate 3 and the pressure plate 4. In other words, the first cam portions 71 are produced as discrete members from the pressure plate 4, and are detachable from the pressure plate 4. Likewise, the first cam portions 71 are provided as discrete members from the lifter plate 3, and are detachable from the lifter plate 3.

The first cam portions 71 are disposed axially between the lifter plate 3 and the pressure plate 4. Additionally, the first cam portions 71 are interposed and held between the lifter plate 3 and the pressure plate 4. As a result, as described above, the first cam portions 71 are configured to be unitarily rotated with the lifter plate 3 and the pressure plate 4. Additionally, the first cam portions 71 are configured to be unitarily moved with the lifter plate 3 and the pressure plate 4 in the axial direction.

Each first cam portion 71 is provided with the through hole 71a extending in the axial direction. Each protrusion 42 of the pressure plate 4 extends within the through hole 71a.

Each first cam portion 71 includes a first cam surface 711. The first cam surface 711 is a slope. The first cam surface 711 tilts to face a first side in the circumferential direction. Additionally, the first cam surface 711 tilts to face toward the pressure plate 4 in the axial direction. It should be noted that in the present preferred embodiment, the first side in the circumferential direction means the right side in FIG. 2. The first cam surface 711 composes one circumferential end surface of each first cam portion 71.

Each first cam portion 71 includes a third cam surface 712. The third cam surface 712 is a slope. The third cam surface 712 tilts to face a second side in the circumferential direction. In other words, the third cam surface 712 faces oppositely to the first cam surface 711 in the circumferential direction. Additionally, the third cam surface 712 tilts to face toward the pressure plate 4 in the axial direction. In other words, the third cam surface 712 faces the same side as the first cam surface 711 in the axial direction. It should be noted that in the present preferred embodiment, the second side in the circumferential direction means the left side in FIG. 2. The third cam surface 712 composes the other circumferential end surface of each first cam portion 71.

The second cam portions 72 are configured to unitarily rotated with the clutch center 5. When described in detail, the second cam portions 72 are integrally constructed with the clutch center 5. In other words, the second cam portions 72 are part of the clutch center 5. Each second cam portion 72 is divided into two halves disposed such that each first cam portion 71 is interposed and held therebetween in the circumferential direction. Specifically, each second cam portion 72 is provided with an opening 720 in its middle part in the circumferential direction. Additionally, each first cam portion 71 is disposed within the opening 720.

Each second cam portion 72 includes a second cam surface 721. The second cam surface 721 is a slope. The second cam surface 721 tilts to face the second side in the circumferential direction. Additionally, the second cam surface 721 tilts to face toward the lifter plate 3 in the axial direction. The second cam surface 721 is opposed to the first cam surface 711. In other words, the first cam surface 711 and the second cam surface 721 tilt in parallel to each other. It should be noted that the second cam surface 721 may be disposed at an interval from the first cam surface 711, or alternatively, may be disposed in contact with the first cam surface 711. The second cam surface 721 composes one of the circumferential end surfaces of each opening 720.

When viewed in the axial direction, the first cam surface 711 and the second cam surface 721 are disposed to overlap with each other. It should be noted that the entirety of the first cam surface 711 and that of the second cam surface 721 may overlap with each other. Alternatively, part of the first cam surface 711 and that of the second cam surface 721 may overlap with each other.

Each second cam portion 72 includes a fourth cam surface 722. The fourth cam surface 722 is a slope. The fourth cam surface 722 tilts to face the first side in the circumferential direction. Additionally, the fourth cam surface 722 tilts to face toward the lifter plate 3 in the axial direction. The fourth cam surface 722 is opposed to the third cam surface 712. In other words, the third cam surface 712 and the fourth cam surface 722 tilt in parallel to each other. It should be noted that the fourth cam surface 722 may be disposed at an interval from the third cam surface 712, or alternatively, may be disposed in contact with the third cam surface 712. The fourth cam surface 722 composes the other of the circumferential end surfaces of each opening 720.

When viewed in the axial direction, the third cam surface 712 and the fourth cam surface 722 are disposed to overlap with each other. It should be noted that the entirety of the third cam surface 712 and that of the fourth cam surface 722 may overlap with each other. Alternatively, part of the third cam surface 712 and that of the fourth cam surface 722 may overlap with each other.

Figure 3:
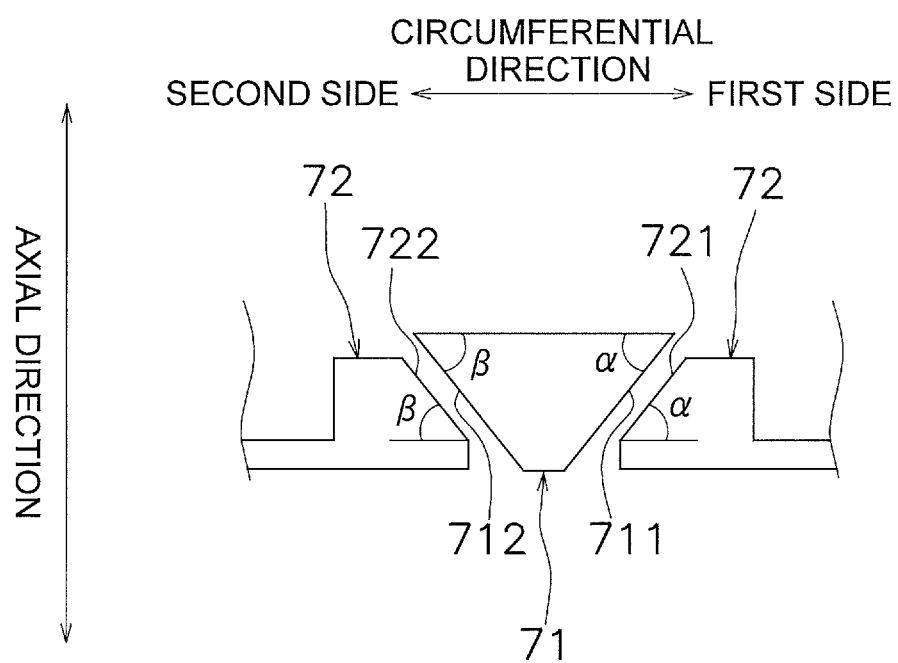
FIG. 3 is a schematic diagram of the cam mechanism.

As shown in FIG. 3, a tilt angle $\alpha$ of each of the first and second cam surfaces 711 and 721 relative to a plane arranged perpendicularly to the axial direction can be set to fall in a range of approximately 20 to 70 degrees. Likewise, a tilt angle $\beta$ of each of the third and fourth cam surfaces 712 and 722 relative to the plane arranged perpendicularly to the axial direction can be set to fall in a range of approximately 20 to 70 degrees. Thus, the tilt angle $\alpha$ of each of the first and second cam surfaces 711 and 721 is the same as the tilt angle $\beta$ of each of the third and fourth cam surfaces 712 and 722. It should be noted that the tilt angle $\alpha$ of each of the first and second cam surfaces 711 and 721 may be different from the tilt angle $\beta$ of each of the third and fourth cam surfaces 712 and 722. For example, the tilt angle $\beta$ of each of the third and fourth cam surfaces 712 and 722 can be set to be greater than the tilt angle $\alpha$ of each of the first and second cam surfaces 711 and 721. With this setting, when the clutch device 100 is rotated to the first side in the circumferential direction, for instance, a smaller clutch engaging force can be produced when a torque is inputted into the clutch device 100 from the clutch center 5 than when a torque is inputted into the clutch device 100 from the input gear 10.

As shown in FIGS. 1 and 2, the urging members 8 are disposed between the lifter plate 3 and the clutch center 5.

The lifter plate 3 and the clutch center 5 are urged oppositely by the urging members 8. For example, the urging members 8 are coil springs.

Next, the action of the clutch device 100 will be explained. It should be noted that the clutch device 100 is assumed to be rotated to the first side in the circumferential direction. When a release operation is not being performed in the clutch device 100, the lifter plate 3 and the clutch center 5 are urged oppositely by the urging members 8. The clutch center 5 is configured to be immovable in the axial direction. Hence, the lifter plate 3 is configured to be moved axially away from the clutch center 5. The lifter plate 3 is coupled to the pressure plate 4. Hence, the pressure plate 4 is configured to be moved axially in the same direction as the lifter plate 3. As a result, the clutch portion 6 is pressed by the pressure applying part 41 and the pressure receiving part 51 while being interposed therebetween, and the clutch portion 6 is switched into the power transmission allowed state.

In this state, a torque from the engine is inputted into the input gear 10 and the clutch housing 2, and is then transmitted to the clutch center 5 and the pressure plate 4 through the clutch portion 6. Additionally, in conjunction with rotation of the first cam portions 71 together with the pressure plate 4, the pressure applying part 41 and the pressure receiving part 51 hold the clutch portion 6 with a larger force while interposing the clutch portion 6 therebetween. Accordingly, the clutch engaging force is increased.

When described in detail, the first cam portions 71 are rotated relatively to the second cam portions 72 to the first side in the circumferential direction by the torque from the pressure plate 4. With this relative rotation, the first cam surface 711 and the second cam surface 721 of each cam mechanism 7 are pressed against each other in the axial direction. As a result, the first cam portions 71 are moved toward the lifter plate 3 in the axial direction. In conjunction with this movement of the first cam portions 71, the pressure applying part 41 of the pressure plate 4 is moved toward the pressure receiving part 51 in the axial direction. As a result, the clutch engaging force is increased.

On the other hand, when a rider returns a throttle grip to reduce acceleration, the second cam portions 72 are rotated relatively to the first cam portions 71 to the first side in the circumferential direction by the torque from the clutch center 5. With this relative rotation, the third cam surface 712 and the fourth cam surface 722 of each cam mechanism 7 are pressed against each other in the axial direction. As a result, the first cam portions 71 are moved toward the lifter plate 3 in the axial direction. In conjunction with this movement of the first cam portions 71, the pressure applying part 41 of the pressure plate 4 is moved toward the pressure receiving part 51 in the axial direction. As a result, the clutch engaging force is increased.

Next, when the rider squeezes a clutch lever, the operating force is transmitted to the release mechanism through a clutch wire and so forth. The lifter plate 3 is moved by the release mechanism against the urging force of the coil springs 8 toward the clutch center 5 in the axial direction. In conjunction with this movement of the lifter plate 3, the pressure plate 4 coupled to the lifter plate 3 is moved away from the clutch center 5 in the axial direction. Accordingly, pressure of the pressure plate 4 onto the clutch portion 6 is released, and the clutch portion 6 is turned into a clutch-off state. In this clutch-off state, rotation from the clutch housing 2 is not transmitted to the clutch center 5.

An exemplary method of manufacturing the clutch device 100 constructed as described above will be explained. First, the pressure plate 4 is prepared. Then, the clutch center 5 is disposed on the pressure plate 4. Specifically, the position of the clutch center 5 is aligned with respect to the pressure plate 4 such that each protrusion 42 of the pressure plate 4 extends through the opening 720 between the second cam surface 721 and the fourth cam surface 722 of each second cam portion 72.

Next, the first cam portions 71 are disposed in the openings 720 of the second cam portions 72, respectively. Specifically, the first cam portions 71 are disposed such that the protrusions 42 of the pressure plate 4 extend within the through holes 71a of the first cam portions 71, respectively. With this construction, the first cam surface 711 is opposed to the second cam surface 721 in each cam mechanism 7, whereas the third cam surface 712 is opposed to the fourth cam surface 722 in each cam mechanism 7.

Next, the urging members 8 are disposed in the recesses 53 of the clutch center 5, respectively. Thereafter, the lifter plate 3 is disposed above the first cam portions 71 and the clutch center 5. Then, the bolts 15 are inserted through the through holes 32 of the lifter plate 3, respectively, and are screwed into the screw holes 42a of the protrusions 42 of the pressure plate 4, respectively. With this construction, the lifter plate 3 and the pressure plate 4 are fixed to each other. On the other hand, the first cam portions 71 are interposed and held between the lifter plate 3 and the pressure plate 4. As a result, the first cam portions 71 are fixed to the lifter plate 3 and the pressure plate 4.

As described above, the first cam portions 71 can be inserted into the openings 720 provided in the second cam portions 72 of the clutch center 5 in a later phase of manufacturing. Therefore, the circumferentially smallest part of the opening 720 of each second cam portion 72 can be designed to be smaller than the circumferentially largest part of each first cam portion 71. As a result, the gap between the first cam surface 711 and the second cam surface 721 can be reduced to a small size in each cam mechanism 7. Likewise, the gap between the third cam surface 712 and the fourth cam surface 722 can be reduced to a small size in each cam mechanism 7.

MODIFICATIONS

The preferred embodiment of the present disclosure has been described above. However, the present disclosure is not limited to the aforementioned preferred embodiment, and a variety of changes can be made without departing from the scope of the present disclosure.

Modification 1

In the aforementioned preferred embodiment, the lifter plate 3 and the pressure plate 4 are fixed to each other by the bolts 15. However, the lifter plate 3 and the pressure plate 4 may be fixed to each other by another type of fastener members.

Modification 2

In the aforementioned preferred embodiment, the coil springs are exemplified as the urging members 8. However, disc springs or so forth may be used instead of the coil springs.

Modification 3

In the aforementioned preferred embodiment, the second cam portions 72 have been explained as part of the clutch center 5. However, the second cam portions 72 may be discrete members from the clutch center 5.

Modification 4

In the aforementioned preferred embodiment, the first cam portions 71 are discrete members from the lifter plate 3. However, the first cam portions 71 may be integrally constructed with the lifter plate 3. In other words, the first cam portions 71 and the lifter plate 3 may be constructed as a single member.

What is claimed is:

1. A clutch device, comprising:
   a lifter plate;
   a pressure plate including a pressure applying part, the pressure plate disposed at an interval from the lifter plate in an axial direction;
   a clutch center including a pressure receiving part, the clutch center disposed between the lifter plate and the pressure plate, the pressure receiving part disposed at an interval from the pressure applying part in the axial direction;
   a clutch portion disposed between the pressure applying part and the pressure receiving part, the clutch portion configured to allow or block transmission of a power therethrough; and
   a cam mechanism including a first cam portion and a second cam portion, the cam mechanism disposed between the lifter plate and the pressure plate, wherein
   the first cam portion is a discrete member from the pressure plate, the first cam portion configured to be unitarily rotated with the lifter plate and the pressure plate,
   the second cam portion is configured to be unitarily rotated with the clutch center,
   the first cam portion is provided with a first cam surface, the first cam surface facing a first side in a circumferential direction, the first cam surface facing the pressure plate in the axial direction,
   the second cam portion is provided with a second cam surface, the second cam surface facing a second side in the circumferential direction, the second cam surface facing the lifter plate in the axial direction, and
   the first cam surface and the second cam surface are opposed to each other.

2. The clutch device according to claim 1, wherein when viewed in the axial direction, the first cam surface and the second cam surface overlap with each other.

3. The clutch device according to claim 1, wherein
   the first cam portion is provided with a third cam surface, the third cam surface facing the second side in the circumferential direction, the third cam surface facing the pressure plate in the axial direction,
   the second cam portion is provided with a fourth cam surface, the fourth cam surface facing the first side in the circumferential direction, the fourth cam surface facing the lifter plate in the axial direction, and
   the third cam surface and the fourth cam surface are opposed to each other.

4. The clutch device according to claim 3, wherein when viewed in the axial direction, the third cam surface and the fourth cam surface overlap with each other.

5. The clutch device according to claim 1, wherein the first cam portion is configured to be unitarily rotated with the lifter plate and the pressure plate while interposed and held therebetween.

6. The clutch device according to claim 1, wherein
   the first cam portion is provided with a through hole extending in the axial direction, and
   the pressure plate includes a protrusion extending within the through hole.

7. The clutch device according to claim 1, further comprising:
   a fastener member fixing the lifter plate and the pressure plate.

8. The clutch device according to claim 1, wherein the first cam portion is a discrete member from the lifter plate.

* * * * *